INVENTOR.
HARLEIGH R. HOLMES
AND LEE E. HOLMES
BY
Martin E. Anderson
ATTORNEY

United States Patent Office 2,920,709
Patented Jan. 12, 1960

2,920,709

STEERING-DRIVE WHEEL ASSEMBLY WITH BEARING ADJUSTING MEANS

Harleigh R. Holmes and Lee E. Holmes, Littleton, Colo., assignors to Harleigh Holmes Four Wheel Drive Co., Littleton, Colo., a corporation of Colorado Application August 16, 1954, Serial No. 450,022

4 Claims. (Cl. 180—43)

This invention relates to improvements in steering wheel assembly for front wheel drive automobiles and trucks.

Automobile trucks are frequently of the four wheel drive type because such drives have many important advantages over trucks having rear wheel drive only. Many specifically different constructions for such dirigible drive wheel constructions are in use and are shown in patents. All such constructions have these two features in common: (1) They are connected with the axle housing by two vertically spaced co-axial and inwardly and upwardly ranging pivots or king pins; (2) A wheel spindle or stub shaft and a universal connection between the wheel spindle and the drive shaft. As an example of such construction attention is called to Marcum 1,899,240 (Figure 12). Such wheel constructions wear and must occasionally be tightened. It has been observed that after the bearings of front wheels have been tightened there develops a jerky transmission of power the reason for which was for some time unexplainable. It has now been clearly demonstrated that the objectionable change in the universal operation that follows the tigthening of the bearings is due to a displacement of the point of universal movement of the universal joint from the king pin axis that will be explained herein together with a simple change that will permit extensive adjustments to be made without in the least upsetting the adjustment of the universal relative to the king pin axis.

This invention can be most clearly explained and will be most readily understood when reference is had to the accompanying drawing in which it has been illustrated and in which.

Figure 1:
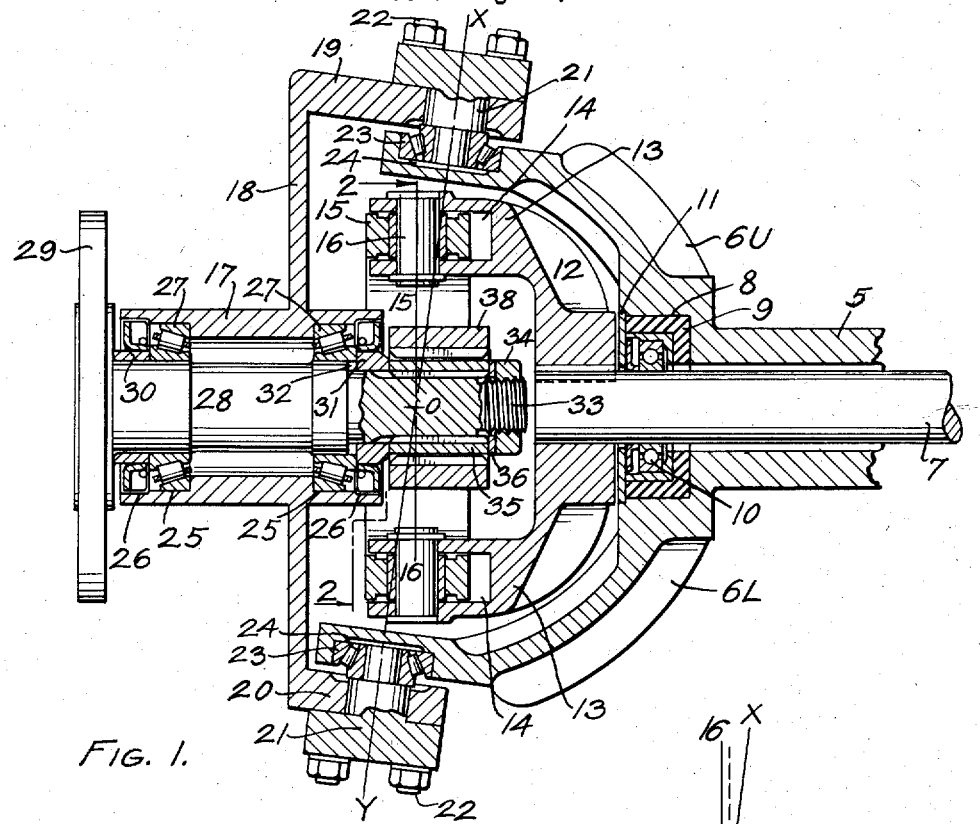
Figure 1 is a diametrical section through the hub and adjacent end of the axle housing showing the relationship of the parts to which this invention relates.

Referring now to the drawing, reference numeral 5 designates the axle housing; numerals 6U and 6L designate respectively the upper and the lower suspension yoke arms. The drive axle has been designated by numeral 7. The outer end of the axle housing has a recess 8 in which is positioned a ring 9 of elastic rubber-like material such as "Duprene" or "neoprene," which resists the action of oil and grease, and in which is positioned a ball bearing 10. The recess is closed by a thrust washer 11. Secured to the outer end of the drive shaft, in any approved manner, is a drive yoke 12 having the usual diametrically positioned yoke arms 13 whose ends terminate in recesses 14 for the reception of diametrically positioned parts of the compensating ring 15. Pins 16 interconnect the drive yoke arms 13 with the compensating ring in the manner shown in the drawing. Tubular hub 17 is formed intermediate its ends with a circular flange 18 which is provided at its uppermost point (as seen in Figure 1) with a lug 19 that is inclined as shown, and at its lowermost point with a shorter lug 20. Lugs 19 and 20 are provided with openings for the reception of bearing caps 21 that are held in place by bolts 22 and whose inner ends extend into the inner races of roller bearings 23 positioned in recesses 24 in the ends of the suspension yoke members 6U and 6L as shown. From the structure above described it is evident that the hub and the axle housing are held fixed except for relative pivotal movement about the king pin axis x—y established by the bearings.

Figure 2:
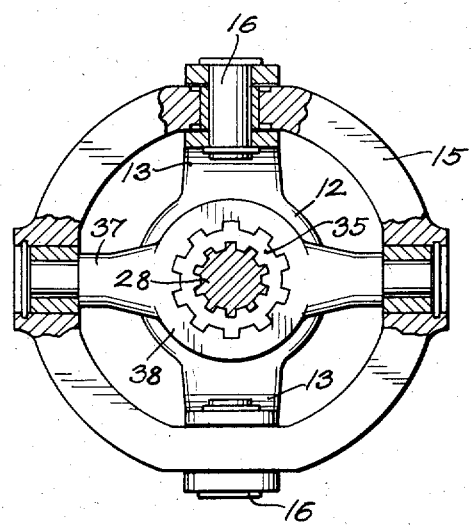
Figure 2 is a view, taken on line 2—2 of Figure 1 partly in section and partly in elevation showing the relationship of the several parts of the universal to the shaft.

The hub is provided at its ends with two sections of increased internal diameter which have been designated by numerals 25 and 26. Combined thrust and radial cone bearings 27 are positioned in the innermost section with the usual grease seals S in the outer sections. A stub wheel drive shaft 28 is provided at its outer end with a wheel supporting flange 29 and is mounted in bearings 27 as shown. A spacer ring 30 is positioned between the inner surface of flange 29 and the inner bearing race as shown. The inner end of shaft 28 is in operative engagement with the inner race of the inner bearing. A spacer ring 31 is positioned on the inner shaft section of reduced diameter with its outer surface in abutting relation to the inner bearing race. There is a space 32 between the outer wall of spacer ring 31 and the shoulder on the shaft, which permits adjustments or tigthening of the bearings to be made for any reason and especially to compensate for wear. The inner end of shaft 28 is splined as shown in Figure 2 and terminates in a threaded section 33 with which nut 34 cooperates to effect an adjustment or tightening of the bearings 27. Pressure from the nut 34 is transmitted to spacer ring 31 by a sleeve 35 that is splined to the shaft as shown most clearly in Figure 2. The outer surface of sleeve 35 is also splined for a purpose that will presently appear. A washer 36 is usually positioned between the nut and the splined sleeves. When the bearings 27 are to be adjusted during the original assembly and later to compensate for wear, the adjustment is effected by nut 34. It will be seen from the drawing that the torque bar 37 has a central hub 38 that encircles the splined sleeve and has a splined connection therewith as shown in Figure 2. It is evident that by interposing the splined sleeve 35 between the shaft and the torque bar and using the sleeve as a means to transmit force and movement from the nut 34 to spacer ring 31 the movement of the sleeve is not transmitted to the torque bar and therefore the relative positions of the universal and the axis of hub pivotation to the suspension yoke are not changed by such adjustment.

In drives employing the Cardan type universal the condition for the optimum operation requires that line x—y, which represents the common axis of bearing cap or pivots 21, shall intersect the common axis of pivots 16 on the axis of shaft 28, which point has been designated by letter O. In constructions in which the torque bar is splined directly to the inner end of the stub wheel drive shaft when the bearings are tightened the universal joint will move axially along the stub shaft; thus, displacing the point of universal movement of the universal joint from the axis of the suspension yoke pivots. Since the angle between line x—y and the common axis of pivots 16 is quite small as can be seen from Figure 1, and therefore if the torque bar is moved even a short distance in the direction of the axis of shaft 28 point O will move a greater distance radially and when this condition occurs such couplings will not operate smoothly following an adjustment of the bearings. It is also evident that unless the parts are constructed and assembled with minute care the coupling parts may not be correctly correlated when the machine leaves the assembly line. When a splined sleeve, such as 35, is interposed between the torque bar 37 and the stub wheel shaft 28 the universal will not be affected by any movement of shaft 28 relative to the hub. In the construction shown in the drawing, in which nut 34 and washer 36 are of such diameter that they can pass through the splined opening in the torque arm the hubs and other parts that are connected therewith can be separated from the axle housing by first removing the bearing plugs 21. The wheel can therefore be readily removed for repair or adjustment. The resilient cup 9 that surrounds bearing 10 permits the bearing to move radially to some extent without setting up severe strains.

Figure 3:
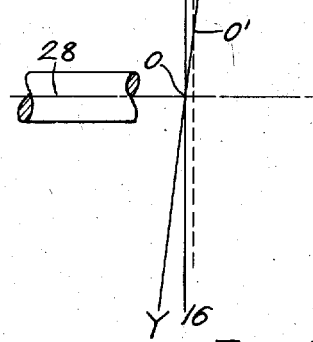
Figure 3 is a view intended for explanatory purposes.

Figure 3 illustrates how a slight movement of pivot axis 16—16 in the direction of the drive axle axis produces a much greater outward movement of point O to O' and from this it is clear that by displacing the torque bar from its normal operative position causes a strained operation of the universal. The single most important feature of the instant invention, therefore, is that stub shaft 28, nut 34, washer 36, bearings 27 and sleeve 35 can move relative to the universal joint and wheel suspension system without having any effect on either the king pin axis or the axis of universal movement in order to accomplish tightening of the bearings.

What is claimed as new is:

1. In a steerable drive wheel assembly of the type having drive means, an axle operatively connected to the drive means for rotational movement, an axle housing enclosing the axle and fixed with respect to the drive means, suspension yoke arms carried by the outer end of the axle housing in vertically spaced diametrical relation, king pins carried on the suspension yoke arms with their common axis intersecting the axis of the axle, a hub assembly mounted on the king pins for pivotal movement about the king pin axis, said hub assembly having a tubular hub with the axis thereof containing the point of intersection between the king pin axis and the axle axis, bearings of the type adapted to resist both radial and thrust forces mounted in each end of the tubular hub, said bearings having outer races in engagement with spaced abutments on the inside surface of the tubular hub to prevent said outer races from moving toward one another, the inner races of said bearings being movable toward one another relative to the outer races to tighten the bearings, a stub shaft mounted for rotation within the bearings with the axis thereof containing the point of intersection of the king pin axis and the axle axis, a wheel rigidly connected to the outer end of the stub shaft, and means for driving the stub shaft comprising a universal joint rigidly attached to the outer end of the axle and operatively connected to the stub shaft for effecting rotational movement thereof, said universal joint moving about a point of universal movement coincident with the common point of intersection of the king pin axis, the axle axis and the stub shaft axis, the improvement which comprises: means for adjusting the bearings without shifting the point of universal movement away from the point of intersection of the king pin axis, the axle axis and the stub shaft axis, said means comprising an axially slidable connection between the stub shaft and the universal joint; and, cooperating abutments carried by the stub shaft in engagement with the inner races of the bearings on opposite sides thereof from the abutments on the tubular hub engaging the outer races, each of said abutments carried by the stub shaft being axially movable independently of the universal joint and at least one of said abutments being movable axially along said stub shaft toward the other of said abutments to tighten the bearings without affecting the relative positions of the universal joint, the hub assembly and the axle housing even though the stub shaft moves axially within the universal joint by reason of the bearing adjustment.

2. In a steerable drive wheel assembly of the type having drive means, an axle operatively connected to the drive means for rotational movement, an axle housing enclosing the axle and fixed with respect to the drive means, suspension yoke arms carried by the outer end of the axle housing in vertically spaced diametrical relation, king pins carried on the suspension yoke arms with their common axis intersecting the axis of the axle, a hub assembly mounted on the king pins for pivotal movement about the king pin axis, said hub assembly having a tubular hub with the axis thereof containing the point of intersection between the king pin axis and the axle axis, bearings of the type adapted to resist both radial and thrust forces mounted in each end of the tubular hub, said bearings having outer races in engagement with spaced abutments on the inside surface of the tubular hub to prevent said outer races from moving toward one another, the inner races of said bearings being movable toward one another relative to the outer races to tighten the bearings, a stub shaft mounted for rotation within the bearings with the axis thereof containing the point of intersection of the king pin axis and the axle axis, a wheel rigidly connected to the outer end of the stub shaft, and means for driving the stub shaft comprising a universal joint rigidly attached to the outer end of the axle and operatively connected to the stub shaft for effecting rotational movement thereof, said universal joint moving about a point of universal movement coincident with the common point of intersection of the king pin axis, the axle axis and the stub shaft axis, the improvement which comprises: means for adjusting the bearings without shifting the point of universal movement away from the point of intersection of the king pin axis, the axle axis and the stub shaft axis, said means comprising an axially slidable connection between the stub shaft and the universal joint; cooperating abutments carried by the stub shaft in engagement with the inner races of the bearings on opposite sides thereof from the abutments on the tubular hub engaging the outer races, at least one of said abutments carried by the stub shaft being movable axially along said stub shaft toward the other of said abutments and independently of the universal joint to tighten the bearings without affecting the relative positions of the universal joint, the hub assembly and the axle housing even though the stub shaft moves axially within the universal joint by reason of the bearing adjustment; threaded means on the end of the stub shaft adjacent the movable abutment; and, means operatively interconnecting the threaded means and movable abutment for adjusting the bearings from the end of the stub shaft, said interconnecting means being axially movable relative to the stub shaft and independently movable relative to the universal joint.

3. A device in accordance with claim 2 in which: the movable abutment is on the inner end of the stub shaft; the threaded means is threaded on the inner end of the stub shaft; and, the means operatively interconnecting the threaded means and the movable abutment comprises a sleeve interconnecting the stub shaft and universal joint for rotational movement, said sleeve being splined to the stub shaft and to the universal joint for axial slidable movement relative to both the stub shaft and universal, said sleeve being of a length to engage both the threaded means and movable abutment thereby forming means for adjusting the bearings from the inner end of the stub shaft without moving the universal joint relative to the axle housing and hub assembly.

4. A device in accordance with claim 3 in which the threaded means is smaller in diameter than the outside diameter of the sleeve but larger in diameter than the inside diameter of the sleeve so that the hub assembly, stub shaft and bearings may be removed as a unit from within the universal without removing the threaded means.

References Cited in the file of this patent

UNITED STATES PATENTS

| | | |
|---|---|---|
| 963,609 | Mascord | July 5, 1910 |
| 1,407,911 | Batenburg | Feb. 28, 1922 |
| 1,631,318 | Gibbs | June 7, 1927 |
| 1,899,240 | Marcum | Feb. 28, 1933 |
| 1,983,533 | Brown | Dec. 11, 1934 |
| 2,042,404 | Keese | May 26, 1936 |
| 2,075,564 | Alden | Mar. 30, 1937 |
| 2,402,562 | Lewis | June 25, 1946 |